(12) United States Patent
Polonichko et al.

(10) Patent No.: US 7,523,658 B1
(45) Date of Patent: Apr. 28, 2009

(54) METHOD FOR MEASURING RIVER DISCHARGE IN THE PRESENCE OF MOVING BOTTOM

(75) Inventors: Vadim Polonichko, San Diego, CA (US); Ramon Cabrera, Miami, FL (US); John Sloat, Las Vegas, NV (US); Matthew J. Hull, San Diego, CA (US); Arthur R. Schmidt, Tolono, IL (US)

(73) Assignee: YSI Incorporated, Yellow Springs, OH (US)

( * ) Notice: Subject to any disclaimer, the term of this patent is extended or adjusted under 35 U.S.C. 154(b) by 0 days.

(21) Appl. No.: 11/956,472

(22) Filed: Dec. 14, 2007

(51) Int. Cl.
*G01F 13/00* (2006.01)
(52) U.S. Cl. ............ 73/170.13; 73/170.03; 73/170.07; 73/170.29
(58) Field of Classification Search . 73/170.01–170.15, 73/170.29–170.34
See application file for complete search history.

(56) References Cited

U.S. PATENT DOCUMENTS

| | | | | |
|---|---|---|---|---|
| 4,270,191 | A | * | 5/1981 | Peynaud ............... 367/91 |
| 5,077,700 | A | * | 12/1991 | Shaw et al. ............ 367/91 |
| 5,515,338 | A | | 5/1996 | Stedtnitz |
| 5,515,721 | A | | 5/1996 | Kim et al. |
| 5,531,125 | A | | 7/1996 | Ahn et al. |
| 5,694,372 | A | * | 12/1997 | Perennes ............... 367/91 |
| 5,952,583 | A | | 9/1999 | Chang |
| 6,052,334 | A | | 4/2000 | Brumley et al. |
| 6,590,831 | B1 | | 7/2003 | Bennett et al. |
| 6,714,482 | B2 | | 3/2004 | Rowe |
| 6,741,209 | B2 | | 5/2004 | Lee |

OTHER PUBLICATIONS

Brumley, B. et al., "Performance of a broad-bank acoustic Doppler current profiler," *IEEE Journal of Oceanic Engineering*, 16, pp. 402-407 (1991).
Simpson and Oltmann, "Discharge-Measurement system using an acoustic Doppler current profiler with application to large rivers and estuaries, United States Geological Survey, Water-Supply Paper 2395" (1993).
Sloat et al., "Methods and Techniques for Moving Vessel Measurements using the SonTek ADP, An introduction to discharge measurements and current surveys," *Methods and Techniques for Real-Time Discharge Measurements*, SonTek/YSI, Inc., San Diego, California (2005).
"Principles of River Discharge Measurement," by SonTek/YSI, Inc., San Diego, California (2003).

\* cited by examiner

*Primary Examiner*—Andre J Allen
*Assistant Examiner*—Jermaine Jenkins
(74) *Attorney, Agent, or Firm*—Thompson Hine LLP

(57) ABSTRACT

A method for measuring channel flow discharge comprising the steps of: locating a platform carrying a fluid flow measurement device at a plurality of stations at spaced locations across a channel; determining the velocity of the platform at each station by averaging the differences between the position of the platform at a first time (t) and the position of the platform at a second time equal to the first time plus a position averaging interval (PI) for a plurality of different first times; obtaining current flow vs. depth profiles at each station by adjusting current velocity as measured by the current flow measuring device for the platform velocity; determining the flow discharge at each station.

18 Claims, 1 Drawing Sheet

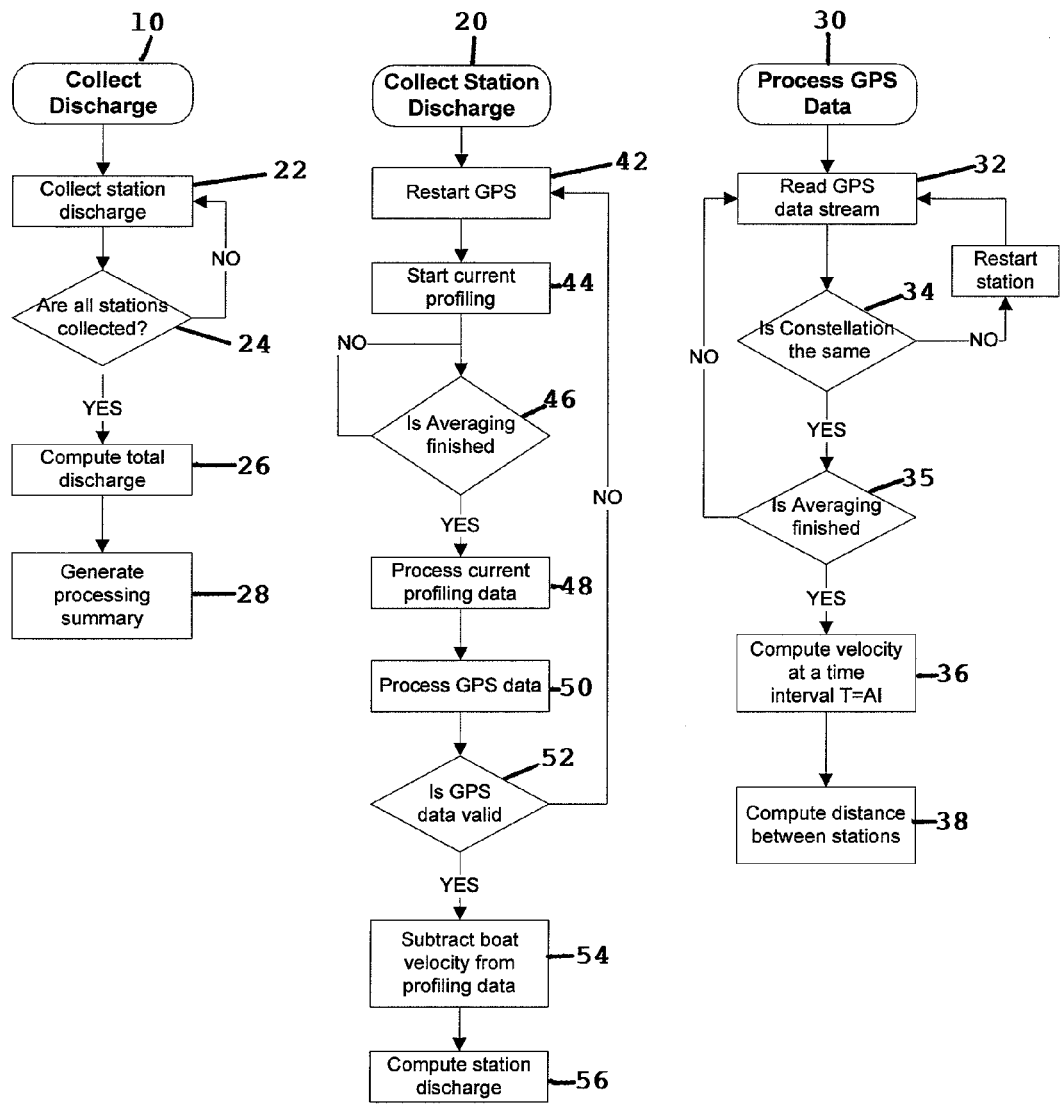

METHOD FOR MEASURING RIVER DISCHARGE IN THE PRESENCE OF MOVING BOTTOM

BACKGROUND

This disclosure relates to methods for measuring river discharge and, more particularly, to a method for measuring river discharge in the presence of moving sediment that can cause bottom-tracking data to become biased.

Acoustic Doppler flow measurement systems remotely measure vertical profiles of water flow velocity, earth-referenced platform velocity, and water depth. These three parameters are measured substantially continuously as the platform carrying the measurement equipment travels across a channel. Water velocity is determined throughout a vertical water column by measuring the Doppler shifted echoes from small particles. The platform's velocity has been determined by measuring the Doppler shifted echoes from the channel bottom or by using electromagnetic navigation systems such as GPS. Channel flow velocity is computed at incremental positions ("stations") across the channel by subtracting the platform referenced channel flow velocity profile measurements from the earth-referenced platform velocity measurements. River cross section is determined from the water depth and platform position measurements. Channel discharge is then computed from the product of the measured mean flow velocity and the channel cross-sectional area. One such method is disclosed in U.S. Pat. No. 6,714,482. In order to determine the current flow rate, it is necessary to correct the measured current for the earth-referenced platform velocity that is determined from the Doppler-shifted echoes from the channel bottom. If the channel bottom is moving, the acoustic measurements become biased and the platform velocity cannot be accurately measured this way.

The algorithm of discharge measurement was originally developed by Christensen and Herrick (1982) "Mississippi River test: Volume 1: Final report" DCP4400/300, prepared for the U.S. Geological Survey by AMETEK/Straza Division, El Cajon, Calif., under contract No. 14-08-0001-19003, and Simpson and Oltmann (1993) "Discharge-Measurement system using an acoustic Doppler current profiler with application to large rivers and estuaries. United States Geological Survey, Water-Supply Paper 2395, where normal component of the measured water velocity across the river is combined with the cross-sectional area to calculate the total discharge.

The general equation for determining river discharge is written as follows:

$$Q = \int \int_S u \cdot \xi ds \quad (1)$$

where Q is the discharge, S is the cross-section area along a boat's track, u is the water velocity vector, and $\xi$ is the unit vector normal to the boat's track at a differential area ds. The area increment ds is determined by the following:

$$ds = |U_b|dzdt \quad (2)$$

where dz is the depth increment, dt is the time increment, $|U_b|$ is the boat speed determined as $|U_b| = \sqrt{U_{bx}^2 + U_{by}^2}$. The coordinate system is defined as follows: z is the vertical axis (FIG. 1), z=0 is the river bottom, and z=H is the water surface, (x, y) form a right hand Cartesian coordinate system with the positive x pointing downstream (FIG. 2).

Eq. (1) can be rewritten using the cross-product of the velocity vector at a depth cell and the boat velocity vector:

$$Q = \int_0^T \left[ \int_0^H u \, dz \right] \cdot \xi |U_b| dt = \int_0^T \int_0^H (u \times U_b) \cdot k \, dz \, dt \quad (3)$$

where T is the total transect time, and k is the unit vector in the vertical direction. In practice, the discharge integral is approximated by the following summation:

$$Q = \Delta t \sum_{i=1}^M [(\overline{U}_w \times U_b) \cdot k]_i H_i \quad (4)$$

where $H_i$ is the average water depth of a measurement segment i, $\Delta t$ is the averaging interval for the segments, M is the total number of the segments in the transect, N is the total number of the good depth cells, $\overline{U}_w$ is the depth averaged water velocity. The summation is performed over a two dimensional grid in the (Y-Z) plane.

The SonTek RiverSurveyor (RS) is an acoustic Doppler system that measures river discharge from a boat. By measuring water and boat velocities and water depth along the boat's track, RiverSurveyor calculates river discharge as the boat moves from one side of the river to the other side. Mounted on a boat, the ADP measures the water velocity relative to the boat while the GPS provides the boat velocity. The absolute water velocity is obtained by subtracting the boat velocity $U_b$ from the measured velocity $U_m$ as:

$$U_w = U_m - U_b \quad (5)$$

These are combined with the depth and distance measurements to compute discharge according to Eq 4.

Traditionally, two complementary methods have been in use for measuring river discharge. One method, called the "section-by-section" or "stationary" method, was established by ISO/USGS. It involves making a series of measurements (generally 20-25) at locations (commonly referred to as stations) along a straight line transecting from one side of the river to the other. Typically, a graduated tag-line is strung from one side of the river to the other side, to indicate the direction of the traverse and to mark the location of measurement stations. Measurements of depth, water velocity and distance along the transect are made at each individual station. Water velocity data are averaged over a time interval that is long enough to reduce natural flow variations. Ideally, the velocity measurement device is kept as still as possible during this averaging time. Depth is measured using separate means that include wading/depth sounding rods, echosounder, etc. This method has also been adopted for use from structures such as cableways and causeways where a velocity measurement device is lowered into water that was otherwise too deep or hazardous for wading measurements.

Another technique of discharge monitoring involves the use of a moving platform (boat) that traverses the width of the river while continuously measuring the water velocity profile, depth, and distance traveled. The distance traveled is measured using a high accuracy Differential GPS (DGPS) receiver and/or an acoustic speed over ground (SOG) device more commonly known as bottom-tracking. In principle, the GPS and SOG data can be combined via a Kalman filter to produce a more robust estimate of the boat speed. Brumley B., Cabrera R., Deines K., Terray E. (1991) Performance of a broad-band acoustic Doppler current profiler. *IEEE Journal of Oceanic Engineering* 16:402-407. Although this augmentation method generally produces more accurate positioning it does not improve performance in the presence of a moving bottom. Moving bed conditions occur when the river bottom becomes liquefied (typically in high sediment or flood conditions), or when a fluid layer of mud covers the river bottom. To improve bottom tracking performance in the presence of a moving bottom, lower frequency acoustic devices have been traditionally employed in order to increase bottom penetration. However, lower frequency systems have generally lower precision and resolution and are more expensive, bulkier, and harder to handle.

The use of DGPS has certain limitations including: a high initial upfront expense for the unit and ongoing costs; poor coverage away from the coastal beacons due to terrain; and low availability of the correction broadcasts internationally. It is not available in many developing countries or in deep canyons and in locations remote from reference stations where flow discharge measurements are often desired. Additionally, DGPS hardware is often expensive and even high quality commercial DGPS receivers do not always perform adequately in small rivers and canals.

Recently, the stationary method of discharge measurement has been adapted to be used from a floating platform (boat) thereby removing the depth limitation of wading measurements. In this method, the river is transected in a set of increments or 'stations'. In this case, the platform transporting the current-measuring device is held as stationary as possible at each station so as to minimize the platform speed relative to the ground so that the speed over ground does not need to be measured. This technique generally requires that the platform position be within about 0.5 to 1.0 m of each station during each measurement. In one example of this operation, at each station, the current profile measurements are typically averaged for a period of approximately one 40 to 60 second measurement interval (MI) to improve precision of Doppler current profiling data and reduce effects of natural flow variability. The main difference with the continuous measurement method is that at each station the boat is kept relatively stationary (by some means such as anchor or speed control) and hence the boat speed over ground does not need to be measured accurately on a second by second basis. As a common practice, all of the stations lie in the same line so they all have a common azimuth, which is a fairly demanding requirement for a wider river and in the presence of ship traffic.

The latter section-by-section method offers improved performance in most extreme flow conditions: e.g., very low flows ($U_w$<0.1 nm/s) and very high flows ($U_w$>2 m/s). In this case, however, the accurate measurement of the platform's velocity in all conditions becomes more difficult, as there is no tagline to assist in station keeping. Therefore, there is a need to be able to obtain accurate velocity estimates of the floating platform in order to produce accurate discharge measurements in rivers of various widths, shipping traffic, and in a variety of flow regimes including floods when moving bottom conditions are likely to occur.

SUMMARY OF THE INVENTION

Platform motion can be estimated by dividing the difference in its position (that is provided by a GPS receiver) by the observation time interval:

$$U_b = dP/dt = [P(t^1) - P(t^0)]/[t^1 - t_0] \qquad (6)$$

In accordance with one embodiment of the invention, at each station at which a current measurement is made, a series of GPS positional measurements is made over a period of time, for example, once per second over a station measurement period of, for example, 300 seconds. For each GPS positional measurement obtained during that time, the velocity of the platform may be determined based on the change in the position of the platform during a time interval hereinafter referred to as the GPS Position Interval (PI) of, for example, 60 seconds. Thus, during a 300-second measurement in which one measurement is made every second, a collection of 240 velocity and positional measurements can be obtained (based upon a PI of 60 seconds) for which the average velocity $\overline{U}$ of the platform can be calculated using the equation:

$$\overline{U} = \frac{1}{N} \sum_{i=1}^{N} [U_i] \qquad (7)$$

wherein N is the number of velocity and positional pairs (e.g., 240 in this example). Thus, for each time increment (e.g., 1 second in this example) beginning with $t_i$=0 to $t_i$=240, based upon the change in the GPS position, relative to the GPS position at $t_i$+PI, a velocity can be determined.

In accordance with one embodiment of the invention, the PI is selected so as to minimize GPS error and to obtain a reliable platform velocity measurement. For example, in one embodiment, the PI may be selected by computing the standard deviation in platform velocity as a function of the PI interval and determining velocity based on the PI that produces the minimum standard deviation. Thus in one embodiment, the platform velocity may be computed with the platform stationary (e.g., docked) using a plurality of averaging intervals (e.g., averaging intervals varying from 1 second to 500 seconds) and the averaging interval at which the first derivative of the standard deviation versus averaging interval function is zero is selected for calculating the platform velocity in Equation (1) above. In another embodiment, PI is determined using an autocorrelation function computed for each averaging interval (for example intervals of about 30 to 90 seconds), and the PI used to determine platform velocity is the averaging interval at which the second derivative is zero.

In accordance with another embodiment, PI may be determined one time, for example, with the platform docked. In this manner, PI compensates for the positional variation inherent in the GPS measurement. It may be somewhat counterintuitive, but GPS positional readings will vary at a fixed location on earth as discussed below in detail.

BRIEF DESCRIPTION OF THE DRAWINGS

The Figure is a flow chart illustrating the GPS-based system in accordance with one embodiment of the invention for measuring river discharge.

DETAILED DESCRIPTION

In accordance with one manifestation of the invention, a GPS-based flow discharge measurement system is provided in which the inaccuracies inherent in GPS and DGPS (to a lesser extent) systems are adjusted for. Position data provided by a typical GPS receiver contain errors that come from sources such as those listed in Table 1. As seen from Table 1, the total error budget is dominated by the atmospheric and satellite error components. Fortunately, the largest error contributions are correlated (e.g., have commonality) over timescales of several minutes. This enables removal of the correlated errors that come from the same source. The analysis is as follows:

TABLE 1

GPS error budget that assumes a modern GPS receiver, assuming full sky view, and reasonable satellite geometry.

| Error Source | Error [m], (1 σ) raw | Error [m], (1σ) mitigated | Time constant |
|---|---|---|---|
| Ionosphere delay | 9 | 4 | ~hr |
| Troposphere delay | 2 | 0.7 | ~5 min |
| Satellite clock | 3 | 2 | ~10 min |
| Satellite orbit | 3 | 2 | ~10 min |
| Multipath | 3 | 1 | ~100 sec |
| Receiver clock noise | 1 | 0.2 | uncorrelated |
| Receiver clock bias | 3 | 1 | ~10 min |

Boat position P(t) at time $t^0$ can be expressed as $$P^0 = P^0_{true} + P^0_{err}, \quad (8)$$

where $P_{true}$ is the true position and $P_{err}$ position uncertainty composed of the following terms
  $P_{rn}$ is position error due to the receiver clock noise
  $P_{rb}$ is position error due to the receiver clock bias
  $P_{atm}$ is position error due to atmospheric propagation (both ionosphere and troposphere)
  $P_{sn}$ is position error due to the satellite clock noise
  $P_{sb}$ is position error due to the satellite clock bias
  $P_{mp}$ is position error due to multipath The magnitude of the total unmitigated error can be on the order of 5-10 m (Table 1), which translates to the instantaneous velocity error of 5 m/s; this is clearly unacceptable for the purposes of accurate discharge measurements. Even when averaged over a period of 40 to 60 s, boat velocity error still remains too large to be of use for accurate positioning purposes.

At a time $t^1$, Eq. (6) becomes $$P^1 = P^1_{true} + P^1_{err}. \quad (9)$$

If the receiver is held stationary during this time interval then $P^1_{true} = P^0_{true}$ and we write:

$$dP = P^1 - P^0 = P^1_{rn} + P^1_{rb} + P^1_{atm} + P^1_{sn} + P^1_{mp} - (P^0_{rn} + P^0_{rb} + P^0_{atm} + P^0_{sb} + P^0_{sn} + P^0_{mp}). \quad (10)$$

Assuming fixed satellite constellation, without significant loss in precision, atmospheric, satellite and receiver bias, errors are assumed to be correlated over a period of several minutes. Eq. (8) is therefore reduced to:

$$dP = dP_{rn} + dP_{mp}, \quad (11)$$

where $dP_{rn}$ and $dP_{mp}$ denote relative errors due to receiver clock noise and multipath. From Table 1 we find that these errors are much smaller than the atmospheric and satellite components and are dominated by the multipath contribution, which is difficult to predict. Multipath errors are most commonly caused by reflections of the radio signal from the nearby structures (buildings, bridges towers, etc) (Grenwal et al 2001). In order to minimize degradation in the position precision due to multipath errors, it is advisable to select a measurement site that is away from any structures that can cause signal reflections.

Neglecting the multipath errors, the total position error is then simply receiver clock noise error that can be easily characterized. Modern stand-alone GPS receivers (such as NovAtel Superstar, Hemisphere Crescent, or U-Blox Lea-4T) have receiver position noise that is on the order of 0.1-0.2 m (1 σ). Stationary field receiver tests produce receiver horizontal position uncertainty on the order of 0.1 m (1 σ) with full sky view and well-distributed satellite constellation.

In accordance with one embodiment of the invention, the river cross-section is segmented into a plurality of discreet units or stations as referred to above. In one embodiment, at least twenty stations may be used with each station accounting for not more than about 5% of the total discharge. If a station accounts for more than 5% of the discharge, the station may be subdivided into stations that account for less than 5% of the flow. By limiting the amount of flow attributed to each station to 5% or less, no station overly impacts the calculation. However, limiting the station to not more than 5% of the total discharge only represents a desirable embodiment of the invention. Those skilled in the art will appreciate that fewer stations and stations accounting for more than 5% of the total discharge may be used with caution, appreciating their potential impact on the total discharge calculation.

The flow chart in FIG. 1 includes three columns. Column 10 diagrams the steps that are performed in one embodiment to obtain the total channel discharge measurement from the sum of the station discharge measurements. Column 20 diagrams the steps that are performed at each station to obtain the station discharge. Column 30 diagrams the steps that are performed to obtain each platform velocity measurement for correcting each station discharge measurement.

In more detail, with reference to column 30, as each station discharge measurement is made, the GPS data stream from a GPS receiver is continuously read or monitored at step 32.

The velocity analysis discussed earlier assumes that the satellite constellation with which the GPS data stream is associated is fixed over the measurement period. If the constellation changes, satellite clock errors become uncorrelated and position precision is degraded. To ensure that constellation changes are detected, a NEMA message that describes space vehicle (SV) composition used for position computations is decoded and the SV index is constructed. Whenever a constellation change is detected, the position measurement is aborted and all data relying on that position is discarded and another measurement is commenced.

As the GPS data stream is downloaded in step 32, the constellation data is simultaneously monitored in step 34. If the constellation is the same, in step 36 the velocity of the platform is computed. If not, step 32 is started over and repeated. A series of GPS positional measurements is made over a period of time; for example, once per second for a period of 300 seconds. For each GPS positional measurement, the velocity of the platform can be determined using Eq. (12) based on the change in the position of the platform during a platform averaging interval PI. In practice, PI can range from about 20 to 120 seconds. PI within this range are consistent with typical measurement practices and are suitable to correct for the GPS error discussed above. A one-second velocity record exhibits substantial noise (0.1 nm/s) and is not adequate for most discharge measurements. However, velocities computed using positions that are sixty seconds apart, for example, exhibit a dramatic improvement in precision (e.g., reduced velocity noise of 0.02 m/s). Accordingly, PI of about 30 to 90 seconds and, more particularly, about 50 to 70 seconds are generally suitable. When the end of the PI is reached, the average platform velocity based on GPS positions differences over the averaging interval period as:

$$U_b(t_i) = [P(t_i + PI) - P(t_i)] / PI \quad (12)$$

Therefore, the instantaneous boat positioning accuracy requirements is much reduced proportionally. For an averaging interval on the order of 60 s, this translates to a 60 time improvement in position precision, compared to the position precision obtained using previously accepted practices. As a result, a commonly available modern GPS receiver can achieve the desired position precision to make river discharge measurements in accordance with this disclosure.

In step 38, the distance between stations is also computed based upon the GPS data as $$\overline{P} = \frac{1}{N}\sum_{i=1}^{N}[P(t_i + AI) - P(t_i)] \tag{13}$$

Step 38 allows one to determine the river cross-section, that is required for the total discharge calculations according to Eq 3.

The platform velocity determined in accordance with column 30 in the flow chart is used to determine station discharge by the process steps illustrated in column 20. The station discharge measurement includes step 42 of restarting the GPS data processing illustrated in column 30 so as to obtain the platform velocity at each station. This is followed by step 44 of starting the current profiling. The current profiling step is performed in a conventional manner using commercially available current profiling equipment. In one example, current profiling is provided using the Sontek RiverSurveyor to obtain an acoustic Doppler profile. In one embodiment, the acoustic Doppler measurement device uses acoustic pulses (Doppler phase-shift detection) to measure water motion in three dimensions (X/north, Y/east, Z/up). The measurement device provides a vertical profile of water velocity, water depth and vessel velocity along the vessel track, and calculates discharge in vertical cells from one bank of the channel to the other. At the beginning of the measurement, a current/discharge averaging interval (MI) is selected based on the expected precision (variability) of the acoustic Doppler profiling measurement. In one embodiment, current velocity measurements are made at each station for about 10 to 300 seconds and, more particularly, 20 to 60 seconds, and, still more particularly, about 40 seconds.

Those skilled in the art will appreciate that shorter measurement intervals (MI) may be used when the velocity measurements are fairly stable (e.g., not more than ±5-10%); and longer measurement periods may be used if the velocity measurements are not stable (e.g., greater than ±5-10%). In step 46, the current velocity data is tested statistically to determine if the data falls within acceptable statistical limits. In one embodiment, an auto averaging function may be employed to compute current velocity variability. In one embodiment, when the variability is within a user defined limit, e.g., ±5-10% of the mean, the system may be programmed to automatically stop collecting Doppler profile measurements and accepts the current velocity data. To evaluate measurement precision in step 46, in one example, the following equation can be used:

$$\sigma_V = 140 C/Fz\sqrt{N} \tag{14}$$

Where $\sigma_V$ is velocity standard deviation in m/s, C is the speed of sound, F is system Frequency, z is the vertical extent of the measurement volume, and N is the number of samples accumulated in the average measurement N=Number Pings/Second times the current velocity averaging interval e.g., 40 seconds. As the averaging interval increases, the number of samples increases thereby reducing the velocity uncertainty.

In step 48, the velocity data is processed to determine the current velocity. As noted, the velocity measurement includes components in three dimensions of which only the component parallel the direction of the channel is included in the discharge measurement.

In step 50, at each station, the GPS data is processed in order to determine the platform velocity per column 30. In step 52, the GPS data is analyzed with respect to statistical variance and constellation consistency (as discussed regarding column 30 and above) before the velocity measurement is accepted as discussed earlier with respect to steps 34 and 35 in column 30. The platform velocity and, more particularly, the component of the platform velocity in the direction of the channel flow is subtracted from the current velocity in step 54. In step 56, the station discharge is computed from the channel velocities determined for each of the vertical cells within the station measurement in a known manner.

After the station discharge has been computed for each station, in column 10 the discharge is calculated for the entire channel. In step 22, the station discharge calculations are collected. In step 24, this process is continued until all stations are accounted for. In one embodiment, in step 26, the discharges are summed in a known manner and the total discharge is determined.

The acoustic doppler measurement device usually cannot measure the entire channel cross-section due to: (1) minimum ADP and vessel depth requirements, (2) transducer draft and blanking distance (top-section), and (3) side-lobe interference (bottom-section). Accordingly, the total discharge for the channel is equal to the sum of the measured discharge for the unit cells plus an estimated discharge for the edge, top and bottom sections. The discharge in these areas can be estimated in a manner known in the art. For example in one embodiment, the discharge in the edge sections can be estimated based on either a constant slope bank assumption using a ratio-interpolation method or a vertical wall. In one embodiment, discharge in the top and bottom sections may be estimated using either a power-law method or constant method as described in more detail below.

Although various embodiments of the disclosed method for measuring river discharge in the presence of moving sediment have been shown and described, modifications may occur to those skilled in the art upon reading the specification. The present application includes such modifications and is limited only by the scope of the claims; and therefore, is to be understood that the present invention is not limited to the particular embodiments disclosed above, but it is intended to cover such modifications and variations as defined by the following claims.

What is claimed:

1. A method for measuring channel flow discharge comprising the steps of:
   a) locating a platform carrying a fluid flow measurement device at a plurality of stations at spaced locations across a channel;
   b) determining the velocity of the platform at each station by averaging the differences between the position of the platform at a first time (t) and the position of the platform at a second time equal to the first time plus a position averaging interval (PI) for a plurality of different first times; and
   c) obtaining current flow vs. depth profiles at each station by adjusting current velocity as measured by the current flow measuring device for the platform velocity.

2. The method of claim 1 wherein the component of the velocity of the platform at each station in the direction of the current flow is subtracted from the current velocity.

3. The method of claim 1 wherein the step of determining the velocity of the platform includes obtaining a series of GPS measurements at fixed time increments over a period of time, determining the position of the platform at each time increment, and determining the average velocity of the platform based on an average of the changes in the position of the platform at a first time versus the position of the platform at a second time that is equal to the first time plus the averaging interval.

4. The method of claim 3 wherein the velocity of the platform is calculated using the equation $$\overline{U} = \frac{1}{N}\sum_{i=1}^{N}[U_i]$$

wherein N is the number of velocity measurements, $U_i$ is the velocity determined based on the change in the position of the platform from a first time and a second time equal to a first time plus an averaging interval.

5. The method of claim 4 wherein the period of time is up to about 500 seconds.

6. The method of claim 5 wherein the period of time is up to about 300 seconds.

7. The method of claim 4 wherein the position averaging interval (PI) is selected by computing standard deviation in velocity as a function of the averaging interval.

8. The method of claim 7 wherein the position averaging interval (PI) is the averaging interval that produces the minimum standard deviation.

9. The method of claim 4 wherein the position averaging interval (PI) is determined by computing standard deviation as a function of the averaging interval and selecting the averaging interval at which the first derivative of the function is zero.

10. The method of claim 4 in which the position averaging interval (PI) is determined based upon an autocorrelation function computed for each averaging interval and the averaging interval at which the second derivative of the function is zero is selected.

11. The method of claim 1 wherein the spaced locations are locations at which multipath GPS error is minimized.

12. The method of claim 1 wherein the station discharge for each station is not more than 5% of the total discharge.

13. The method of claim 1 wherein the current flow measurement device uses acoustic pulses to measure water motion.

14. The method of claim 13 wherein water motion is measured in following dimensions: North-South, East-West, and vertical.

15. The method of claim 1 wherein the current measurement device provides a vertical profile of water velocity and water depth and calculates channel discharge in vertical cells.

16. The method of claim 1 wherein the position averaging interval (PI) is determined with the platform at a fixed location.

17. The method of claim 1 wherein the method includes the additional step of determining the flow discharge for each station.

18. The method of claim 17 wherein the method includes the step of determining the channel flow discharge.

* * * * *